United States Patent
Lenka et al.

(10) Patent No.: US 9,633,050 B2
(45) Date of Patent: Apr. 25, 2017

(54) METHODS FOR ASSESSING IMAGE CHANGE AND DEVICES THEREOF

(71) Applicant: Wipro Limited, Bangalore (IN)

(72) Inventors: Anil Kumar Lenka, Bangalore (IN); Raghavendra Hosabettu, Bangalore (IN); Abhijith Vijaya Kumar Rugminibai, Bangalore (IN)

(73) Assignee: Wipro Limited, Bangalore (IN)

( * ) Notice: Subject to any disclaimer, the term of this patent is extended or adjusted under 35 U.S.C. 154(b) by 525 days.

(21) Appl. No.: 14/245,486

(22) Filed: Apr. 4, 2014

(65) Prior Publication Data
US 2015/0242686 A1 Aug. 27, 2015

(30) Foreign Application Priority Data
Feb. 21, 2014 (IN) .............................. 850/CHE/2014

(51) Int. Cl.
*G06K 9/00* (2006.01)
*G06F 17/30* (2006.01)
*G06K 9/62* (2006.01)
*G06K 9/46* (2006.01)

(52) U.S. Cl.
CPC ....... *G06F 17/3028* (2013.01); *G06K 9/6202* (2013.01); *G06K 9/6215* (2013.01); *G06K 9/4671* (2013.01)

(58) Field of Classification Search
None
See application file for complete search history.

(56) References Cited

U.S. PATENT DOCUMENTS

| | | | |
|---|---|---|---|
| 5,798,830 A | 8/1998 | Srinivasan | |
| 6,909,798 B1 | 6/2005 | Yukawa et al. | |
| 8,165,384 B1 | 4/2012 | Ma et al. | |
| 8,212,812 B2 * | 7/2012 | Tsin .................... | G06F 17/5095 345/420 |
| 8,443,301 B1 * | 5/2013 | Easterly .............. | G01M 17/007 715/848 |

(Continued)

OTHER PUBLICATIONS

Abdelrahman et al.,Precise Change Detection in Multi-Spectral Remote Sensing Imagery Using SIFT-based Registration, 2011 IEEE, pp. 6238-6242.*

(Continued)

*Primary Examiner* — Jason Heidemann
(74) *Attorney, Agent, or Firm* — LeClairRyan, a Professional Corporation (57) ABSTRACT

A method, non-transitory computer readable medium, and an image analysis computing device that retrieves, based on a captured version of an object in a received image, training images which display related versions of the object and items of data related to the related versions of the object of the training images. Keypoints which are invariant to changes in scale and rotation in the captured version of the object in the received image and in the related versions of the object in the training images are determined. Changes to the object in the received image based on any of the determined keypoints in the related version of the object which do not match the determined keypoints in the captured version of the object are identified. The identified changes in the captured version of the object in the received image are provided.

24 Claims, 9 Drawing Sheets

(56) References Cited

U.S. PATENT DOCUMENTS

| | | | |
|---|---|---|---|
| 9,098,655 B2* | 8/2015 | Plummer | G06Q 40/00 |
| 9,131,224 B1* | 9/2015 | Freeman | G01S 17/023 |
| 9,262,789 B1* | 2/2016 | Tofte | G06Q 40/08 |
| 2005/0200623 A1* | 9/2005 | Smith | G06F 17/5095 345/419 |
| 2006/0002604 A1 | 1/2006 | Sakai et al. | |
| 2008/0015802 A1 | 1/2008 | Urano et al. | |
| 2008/0075355 A1 | 3/2008 | Ben-Yishay et al. | |
| 2008/0294401 A1* | 11/2008 | Tsin | G06F 17/5095 703/8 |
| 2009/0198464 A1 | 8/2009 | Clarke et al. | |
| 2012/0076437 A1 | 3/2012 | King | |
| 2014/0270492 A1* | 9/2014 | Christopulos | G06K 9/00637 382/159 |

OTHER PUBLICATIONS

Radke et al., "Image Change Detection Algorithms: A Systematic Survey", Mar. 2005, IEEE Transactions on Image Processing, vol. 14, No. 3, pp. 294-307.*

* cited by examiner

METHODS FOR ASSESSING IMAGE CHANGE AND DEVICES THEREOF

This application claims the benefit of Indian Patent Application No. 850/CHE/2014 filed Feb. 21, 2014, which is hereby incorporated by reference in its entirety.

FIELD

This technology generally relates to methods and devices for image analysis and, more particularly, methods for automatically assessing image change and devices thereof.

BACKGROUND

Many business and production scenarios require accurate visual inspection and automatic assessment of objects. Current applications for performing visual inspection and assessment perform comparisons of current images taken in real-time with a set of old images to assess change in the object. However, the conditions under which the current images are acquired impact the ability to obtain an accurate comparison. Specifically, factors, such as image position, alignment, orientation, and background, can lead to inaccuracies.

Image comparison to detect object changes also may be impacted by the different materials of which an object is comprised. Different materials, such as glass, plastic, rubber, wood, etc., may be altered in different manners due to their different mechanical behavior. This leads to further inaccuracies in the image comparison. Accordingly, current applications fail to provide an accurate image change assessment analysis based on the comparison of a current real-time image and a set of older images.

SUMMARY

A method for assessing image change, the method comprising retrieving, by an image analysis computing device, based on a captured version of an object in a received image, one or more training images which display one or more related versions of the object and one or more items of data related to the one or more related versions of the object of the one or more training images. One or more keypoints which are invariant to changes in scale and rotation in the captured version of the object in the received image and in the related versions of the object in the one or more training images are determined. One or more changes to the object in the received image based on any of the determined one or more keypoints in the related version of the object which do not match the determined one or more keypoints in the captured version of the object are identified. The identified one or more changes in the captured version of the object in the received image are provided.

A non-transitory computer readable medium having stored thereon instructions for assessing image change comprising machine executable code which when executed by a processor, causes the processor to perform steps including retrieving, based on a captured version of an object in a received image, one or more training images which display one or more related versions of the object and one or more items of data related to the one or more related versions of the object of the one or more training images. One or more keypoints which are invariant to changes in scale and rotation in the captured version of the object in the received image and in the related versions of the object in the one or more training images are determined. One or more changes to the object in the received image based on any of the determined one or more keypoints in the related version of the object which do not match the determined one or more keypoints in the captured version of the object are identified. The identified one or more changes in the captured version of the object in the received image are provided.

A image analysis computing device includes a processor coupled to a memory and configured to execute programmed instructions stored in the memory including retrieving, based on a captured version of an object in a received image, one or more training images which display one or more related versions of the object and one or more items of data related to the one or more related versions of the object of the one or more training images. One or more keypoints which are invariant to changes in scale and rotation in the captured version of the object in the received image and in the related versions of the object in the one or more training images are determined. One or more changes to the object in the received image based on any of the determined one or more keypoints in the related version of the object which do not match the determined one or more keypoints in the captured version of the object are identified. The identified one or more changes in the captured version of the object in the received image are provided.

This technology provides a number of advantages including providing methods, non-transitory computer readable medium, and an image analysis computing device that automatically and accurately provide an image analysis and assessment. With this technology, differences in image acquisition between images are accounted for to improve image comparison accuracy. The present technology also provides an analysis of various types of defects in the different parts and sub-parts of objects in the images which may be constructed of different materials. Further, the present technology provides an iterative image analysis process that improves accuracy in classifying parts and sub-parts of objects through machine learning to more accurately assess image change and to identify specific types of changes in an object.

DETAILED DESCRIPTION

Figure 1:
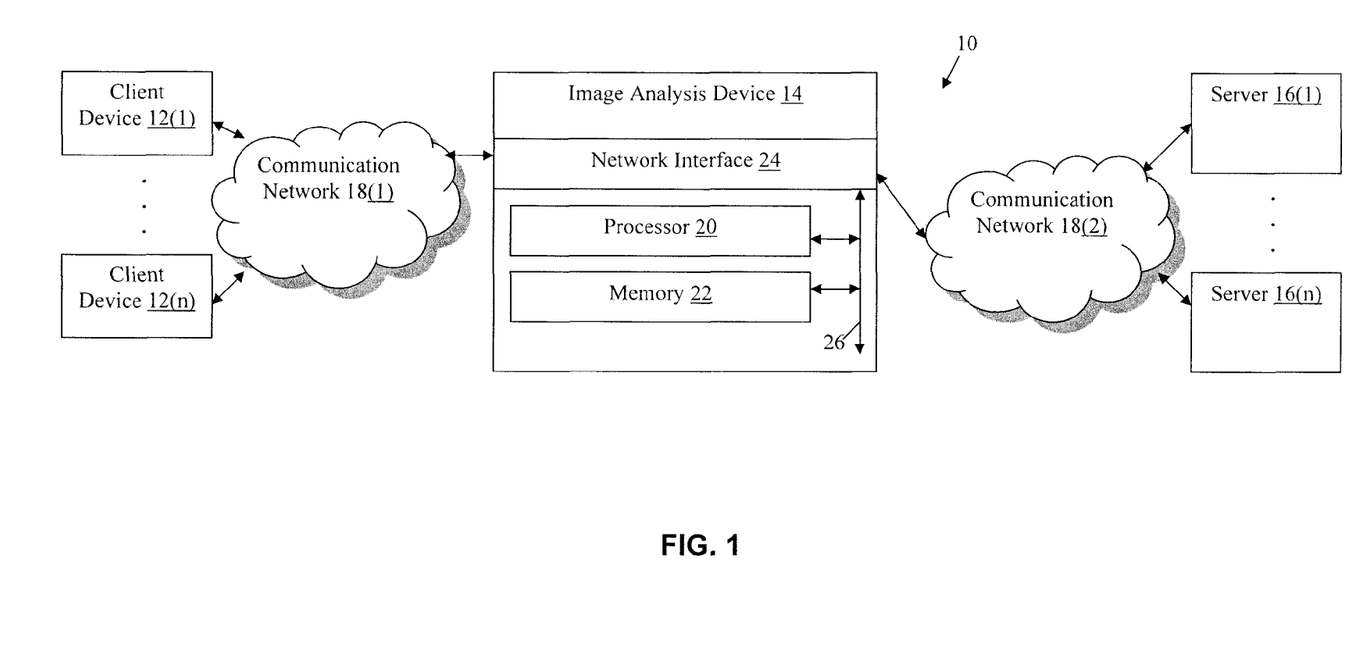
FIG. 1 is a block diagram of an environment with an exemplary image analysis computing device.

An environment 10 with an exemplary image analysis computing device 14 is illustrated in FIG. 1. In this example, the environment 10 includes client devices 12(1)-12(n), the image analysis computing device 14, and server 16 which are coupled by communication networks 18(1)-18(2), although the environment could include other types and numbers of systems, devices, components, and/or other elements in other configurations and environments with other communication network topologies. This technology provides a number of advantages including providing methods, non-transitory computer readable mediums, and devices that facilitate an automatic and accurate image analysis to determine image change in an object shown in the image based on an image comparison.

Referring more specifically to FIG. 1, the client devices 12(1)-12(n) enable a user to request and receive information from at least the image analysis computing device 14 for image analysis and assessment as illustrated and described with the examples herein, although the client devices 12(1)-12(n) could perform other types and numbers of functions and other operations. By way of example only, the client devices 12(1)-12(n) may comprise computing devices configured to communicate with the image analysis computing device 14 to obtain content, such as one or more web pages or dashboard interfaces, stored at the image analysis computing device 14 and/or to send information to the image analysis computing device 14.

The client devices 12(1)-12(n) include at least one processor, a memory, a user input device, a display, and a network interface, which are coupled together by a bus or other link, although one or more of client devices 12(1)-12(n) can include other numbers and types of components, parts, devices, systems, and elements in other configurations. The processor in each of the client devices 12(1)-12(n) can execute programmed instructions stored in the memory of each of the client devices 12(1)-12(n) for one or more aspects of the present invention as described and illustrated herein, although the processors could execute other numbers and types of programmed instructions.

The memory in each of the client devices 12(1)-12(n) stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in the client devices 12(1)-12(n).

The user input device in each of the client devices 12(1)-12(n) can be used to input selections, such as a request for content or information from the image analysis computing device 14, although the user input devices could be used to input other types of requests and data. The user input devices can include keypads or touch screens although other types and numbers of user input devices can be used. The display in each of the client devices 12(1)-12(n) can be used to show data and information to the user, such as a dashboard interface, in response to a request for the information from the image analysis computing device 14. The network interface in each of the client devices 12(1)-12(n) can be used to operatively couple and communicate between the client devices 12(1)-12(n) and at least the image analysis computing device 14 via the communication network 18(1).

The server 16 includes at least one processor, a memory, and a network interface configured to communicate with the image analysis computing device 14 via communication network 18(2), although the server 16 could have other numbers and types of components, parts, devices, systems, and elements in other configurations and locations.

The image analysis computing device 14 includes at least one processor 20, a memory 22, and a network interface 24, which are coupled together by a bus 26 or other link, although other numbers and types of components, parts, devices, systems, and elements in other configurations and locations can be used. The processor 20 in the image analysis computing device 14 executes a program of stored instructions for one or more aspects of the present invention as described and illustrated by way of the embodiments herein, although the processor 20 could execute other numbers and types of programmed instructions.

The memory 22 in the image analysis computing device 14 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 20, can be used for the memory 22 in the image analysis computing device 14.

The network interface 24 in the image analysis computing device 14 is used to operatively couple and communicate between the image analysis computing device 14, the client devices 12(1)-12(n) and the server 16 via the communication networks 18(1)-18(2), although other types and numbers of communication networks 18(1)-18(2) with other types and numbers of connections and configurations can be used. Additionally, one or more of the communication networks 18(1)-18(2) can include one or more local area networks (LANs) and/or wide area networks (WANs). By way of example only, the communication networks can use TCP/IP over Ethernet and industry-standard protocols, including hypertext transfer protocol (HTTP) and/or secure HTTP (HTTPS), for example, although other types and numbers of communication networks also can be used.

Although embodiments of the image analysis computing device 14, the client devices 12(1)-12(n), and the server 16, are described and illustrated herein, each of the image analysis computing device 14, the client devices 12(1)-12(n), and the server 16 can be implemented on any suitable computer apparatus or computing device. It is to be understood that the apparatuses and devices of the embodiments described herein are for exemplary purposes, as many variations of the specific hardware and software used to implement the embodiments are possible, as will be appreciated by those skilled in the relevant art(s).

Furthermore, each of the devices of the embodiments may be conveniently implemented using one or more general purpose computers, microprocessors, digital signal processors, and micro-controllers, programmed according to the teachings of the embodiments, as described and illustrated herein, and as will be appreciated by those ordinary skill in the art.

The embodiments may also be embodied as one or more non-transitory computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

Figure 2:
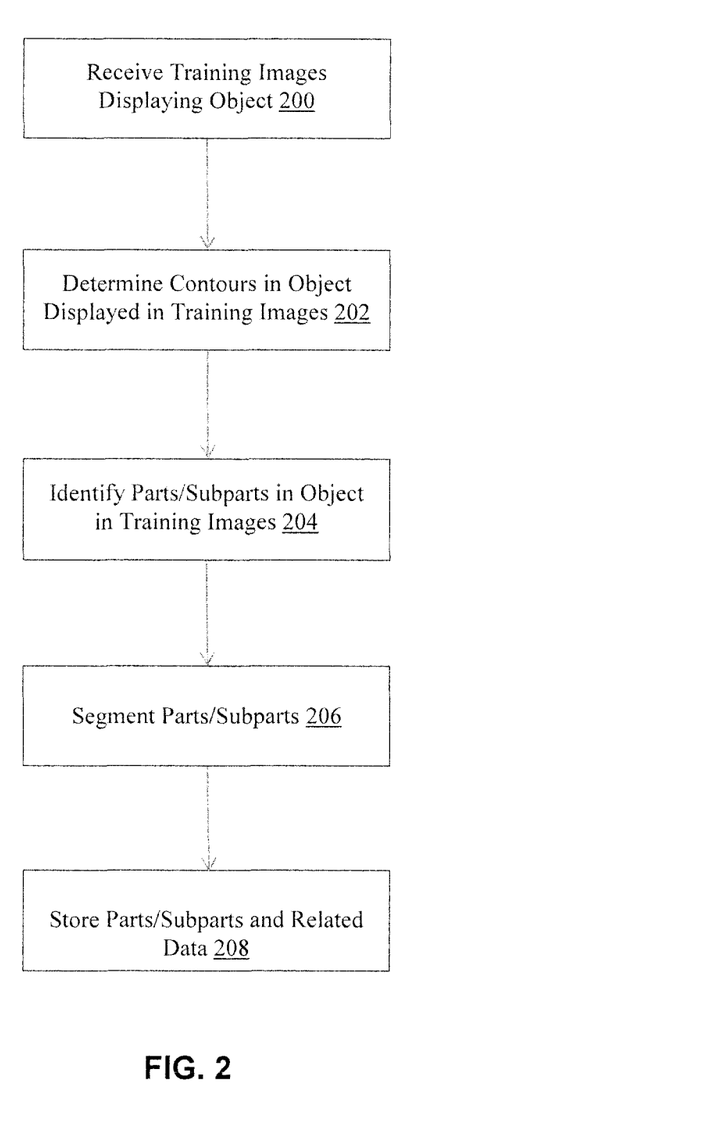
FIG. 2 is a flowchart of an exemplary method for processing one or more training images.

An example of a method for assessing image change will now be described with reference to FIGS. 1-9. Referring more specifically to FIG. 2, an exemplary method for processing one or more training images for use in assessing image change is illustrated. In step 200, the image analysis computing device 14 receives a set of training images displaying an object in .jpeg format, although the training images can be in another other standard image format, such as .gif or .png. The training images may be received from the server 16, although the training images may be received from other devices or locations. The object displayed in the training image is a vehicle, such as illustrated in FIG. 4, although the method may be utilized with various other objects. Although the present method is described with respect to an image of a vehicle as the object, other types and numbers of objects related to different industries, such as, for example, pharmaceutical, manufacturing, construction, banking, insurance, or others. The set of training images may include multiple images of the object, such as the vehicle in FIG. 4, under different conditions such as, by way of example only, orientation, lighting conditions, background, scale, and image contrast.

Referring again to FIG. 2, in step 202, the image analysis computing device 14 the image analysis computing device 14 determines one or more contours of the object shown in the training images by thresholding the set of training images. In this example, the image analysis computing device converts the set of training images from RGB to grayscale, although in other examples a thresholding analysis of color images may be performed. In this example, the image analysis computing device 14 utilizes a particular threshold grayscale value to determine the contours, or boundaries, of the object in the training images which is input by a user through client devices 12(1)-12(n), although other approaches may be used, such as automated methods of determining the optimal threshold value by for example extracting information from a histogram, as known to one of ordinary skill in the art may be utilized. The threshold values to be applied may be stored, by way of example only, in the memory 22 of the image analysis computing device 14, although the threshold values may be stored in other locations on various devices, such as server 16.

Next, in step 204, the image analysis computing device 14 identifies one or more parts of the object shown in the training images based on the contours, or boundaries, of the object as determined in step 204. The parts may include various parts of the object, such as by way of example only a front bonnet (hood), front grille, bumper, headlight, windshield, rear view mirror, or wheel in the vehicle illustrated in FIG. 4, although other types and/or numbers of other parts may be identified. The image analysis computing device 14 may further identify one or more subparts in the identified parts, such as the mirror portion of the rear view mirror by way of example only.

Referring back to FIG. 2, in step 206 the image analysis computing device 14 segments the identified parts/subparts of the object in the training images. In this example, the identified parts/subparts are segmented into triangular sections, although other segmentations may be utilized. In this example, the triangular sections are drawn on the image based on threshold values of the grayscale image, although other values may be utilized to segment the image. In this example, the number of triangles per part is stored in the memory 22 of the image analysis computing device 14, although the number of triangles may be stored on other types and/or numbers of devices in other location, such as one or more of the server 16 by way of example only.

Next, in step 208 the image analysis computing device 14 stores the identified parts of the object along with one or more items of data related to the identified parts. By way of example only, the one or more items of data include an identification of the part, the position of the part on the object, and a description of the part. The description of the part may include, by way of example, the specific material from which the part is constructed, such as rubber, glass, or metal. In this example, the one or more items of data are input by a user through client devices 12(1), although the one or more items of data may be received in other manners from other devices in other locations, such as server 16. In this example, the identified parts and associated data are stored in parts in the memory 22 of the image analysis computing device 14, although the parts and related data may be stored in other locations on various devices, such as server 16.

Figure 3:
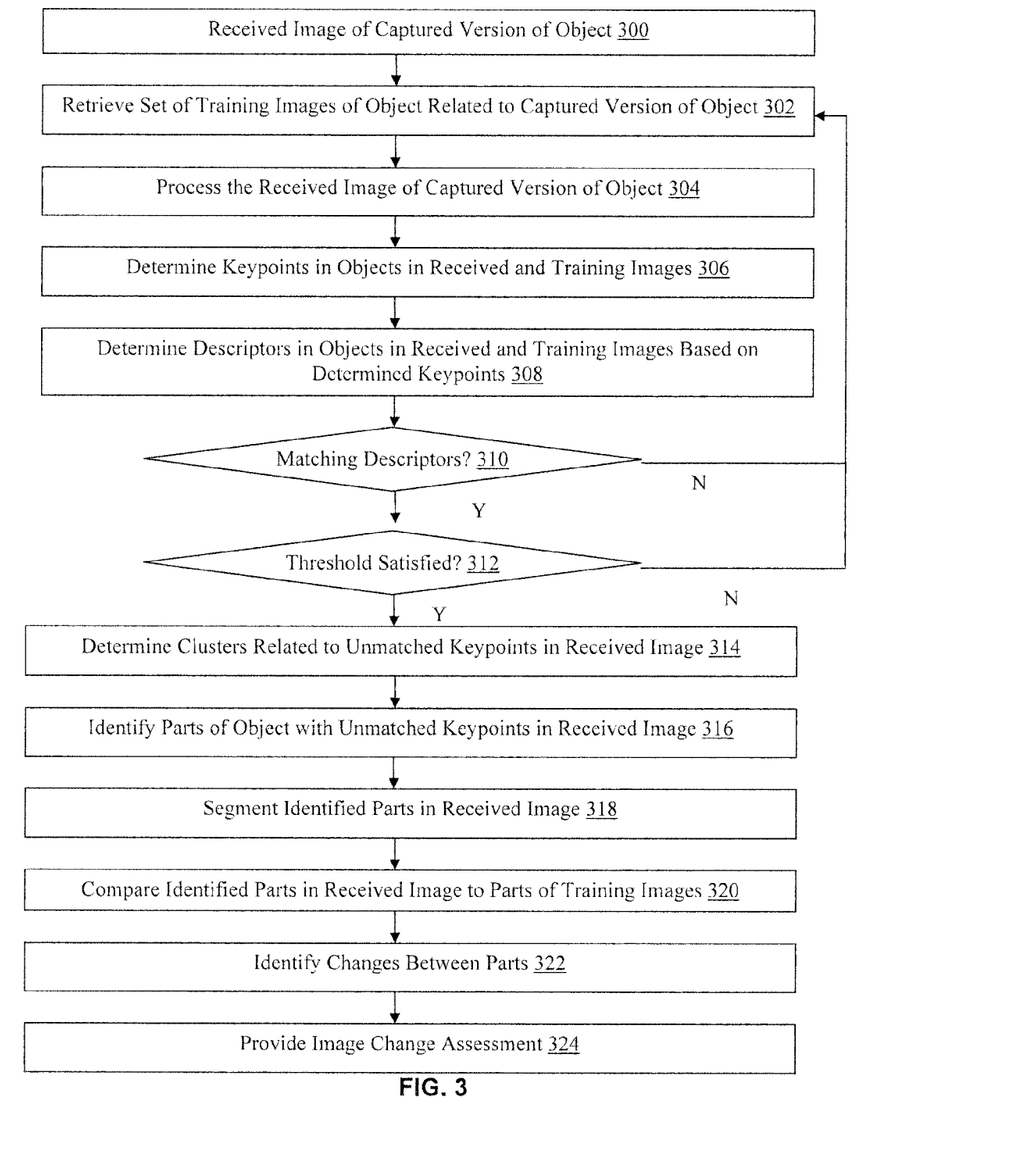
FIG. 3 is a flowchart of an exemplary method for assessing image change.
Figure 4:
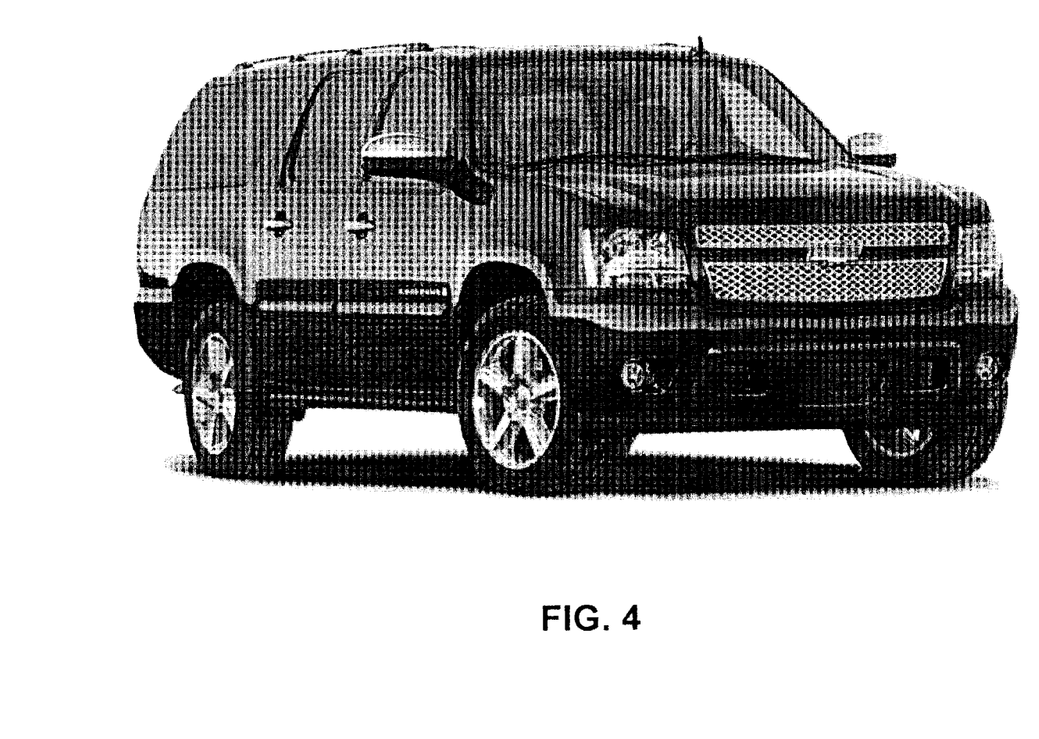
FIG. 4 is a screen shot of an exemplary training image.

Referring now to FIG. 3, an exemplary method of assessing image change will be described. In step 300 the image analysis computing device 14 receives an image of a vehicle with damage incurred during an accident as illustrated in FIG. 4 in .jpeg format, although the received image may include various other objects for which image analysis is desired in other image formats, such as .gif or .png, by way of example only. The image of the captured version of the object is received from one of the client devices 12(1)-12(n), although the received image may be received from other devices in other locations.

In step 302 the image analysis computing device 14 retrieves a set of training images based on the captured version of the object in the image received in step 300. The training images are one or more vehicles related to the captured version of the vehicle illustrated in FIG. 5, such as, for example, the vehicle illustrated in FIG. 4. The training images have been processed as described above with respect to FIG. 3. The image training device 14 also retrieves the one or more items of data associated with the object displayed in the training images. The training images and associated data are retrieved from the memory 22 of the image analysis computing device 14, although the training images and associated data can be stored in other locations on other devices, such as server 16.

Referring again to FIG. 3, in step 304 the image analysis computing device 14 thresholds the image, eliminates background, reorients and resizes the image, adjusts image contrast, normalizes brightness of the image, removes image noise, and segments the captured version of the object in the received image, although other image processing techniques that facilitate comparison of the images may be utilized. The image analysis computing device 14 determines one or more contours of the captured version of the object shown in the image received in step 300 by thresholding the received image. The image analysis computing device 14 converts the set of training images from RGB to grayscale, although this conversion is not required and in other examples thresholding of color images may be performed. The image analysis computing device 14 utilizes a threshold grayscale value to determine the contours, or boundaries, of the captured version of the object in the received image which is input by a user through client devices 12(1), although automated methods of determining the optimal threshold value, such as extracting information from a histogram, as known in the art may be utilized. The threshold values to be applied may be stored, by way of example only, in the memory 22 of the image analysis computing device 14, although the threshold values may be stored in other locations on various devices, such as in the server 16 by way of example only.

The processing also includes, by way of example only, isolating the captured version of the object to remove background and other unrelated data. In this example, the captured version of the object is extracted from the received image using a bounding box as the outer edge, although other methods may be utilized to isolate the captured version of the object. The use of the bounding box to define the outer edge of the captured version of the object is based on the contours, or boundaries, of the object determined as a result of the thresholding analysis. The processing in step 304 also includes, by way of example only, resizing and reorienting the captured version of the object in the received image. The object is resized and reoriented based on the set of training images retrieved in step 302 to facilitate comparison of the captured version of the object and the object displayed in the training image. The orientation of the captured version of the object is determined, by way of example only, through the use of a bounding box, although other methods of detecting object orientation in an image may be utilized.

Figure 6:
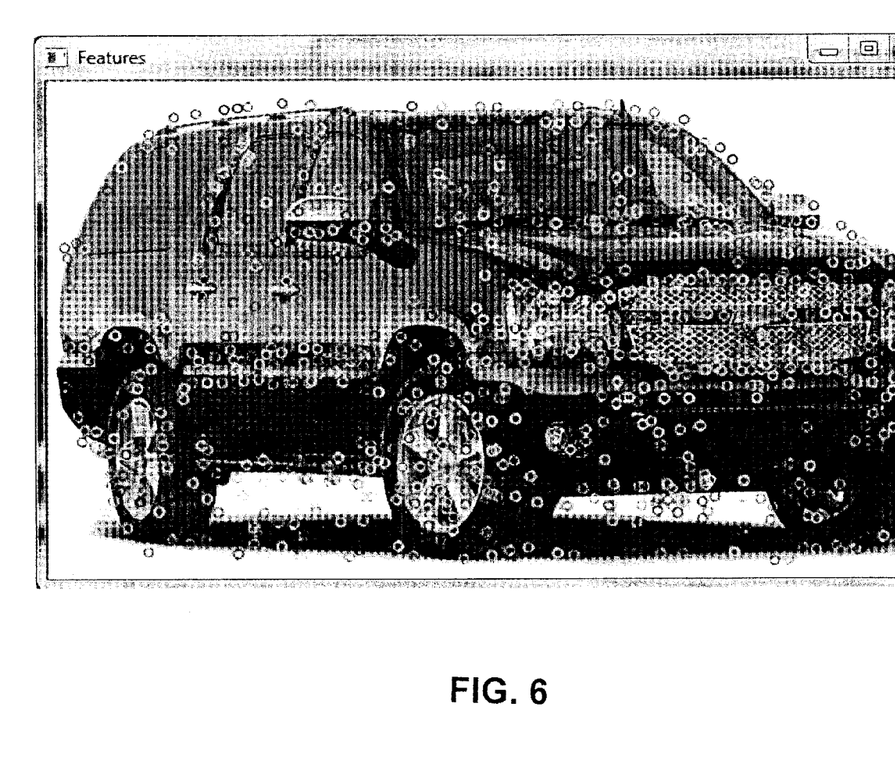
FIG. 6 is a screen shot of exemplary determined keypoints in the training image shown in FIG. 4.
Figure 7:
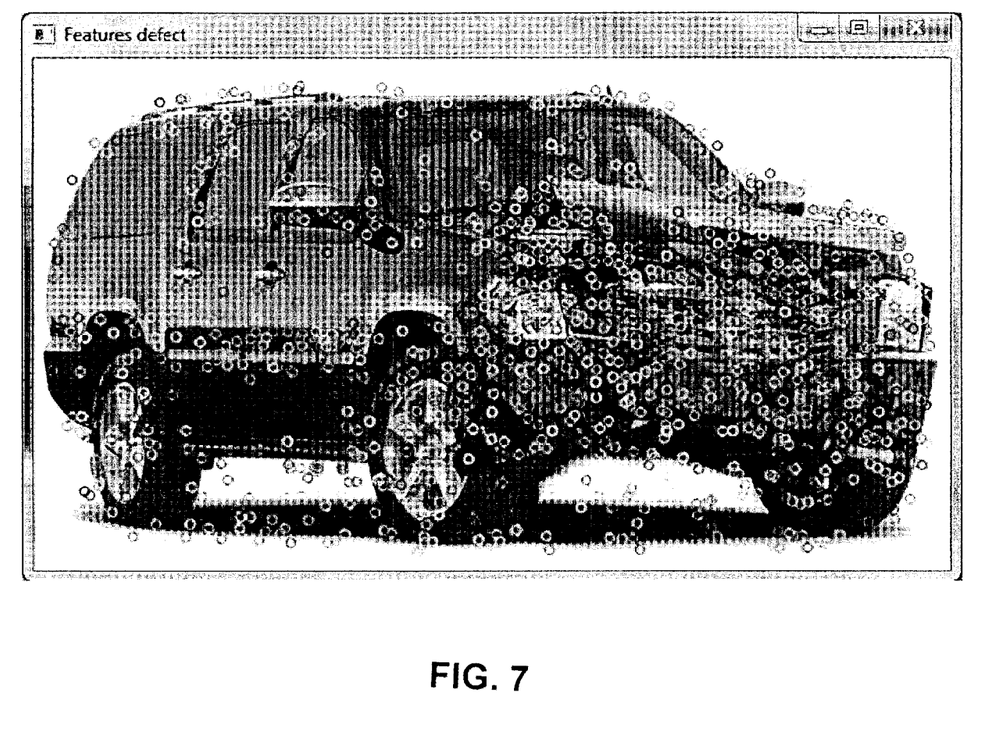
FIG. 7 is a screen shot of exemplary determined keypoints in the captured version of an object in the received image.

In step 306, the image analysis computing device 14 determines one or more keypoints in the objects shown in the retrieved set of training images and the captured version of the object in the received image to determine one or more features of the objects. The keypoints are points in the images with well-defined positions and scale in image space, which are stable under local and global perturbations in the image domain. For example, the keypoints are points in the images that are, by way of example only, invariant to rotation and scale, although the keypoints may have other types and numbers of properties. The features defined by the keypoints include, by way of example, edges, corners, or other regions of interest in the images, although other features may be defined by the keypoints. FIG. 6 illustrates keypoints determined, for example, for the vehicle illustrated in FIG. 4, while FIG. 7 illustrates keypoints determined, for example, for the damaged vehicle illustrated in FIG. 5. In this example, the keypoints are determined using a feature detector algorithm such as, by way of example only, SIFT, SURF, or Fast, although other methods of determining keypoints in the images may be utilized. The feature detector algorithm may be stored in memory 22 of the image analysis computing device 14, although the feature detector algorithm may be stored in other locations on various devices, such as server 16.

Next, in step 308, the image analysis computing device 14 determines descriptors for the keypoints determined in step 306. The descriptors include a vector which indicates one or more visual features of the image related to the determined keypoints, such as shape, color, material, texture, or other visual feature used to identify the particular keypoint. The descriptors may be determined by the image analysis computing device 14 using image processing techniques, although the descriptors related to each keypoint may also be input by a user through client devices 12(1). In one example, the keypoints in the training images are assigned a weightage factor, which is based on the sensitivity of the particular keypoint to change for purposes of image change analysis. In the example of the training image of the vehicle illustrated in FIG. 4, the keypoints may be assigned based on the material of the part on which the keypoint is located, although the weightage may be based on other aspects of the keypoint which relate to potential changes in the object as viewed in an image displaying the object. For example, for a glass portion of the vehicle, such as the windshield, would have a high weightage as mismatched keypoints in the windshield could indicate severe damage or change to the vehicle. Keypoints in other materials on the vehicle illustrated in FIG. 4, such as metal or rubber, would have lower weightages, as mismatched keypoints are unlikely to indicated the same level of severity of change. In this example, the determined keypoints and descriptors are stored in in the memory 22 of the image analysis computing device 14, although the keypoints and descriptors may be stored in other locations on various devices, such as server 16.

Figure 8:
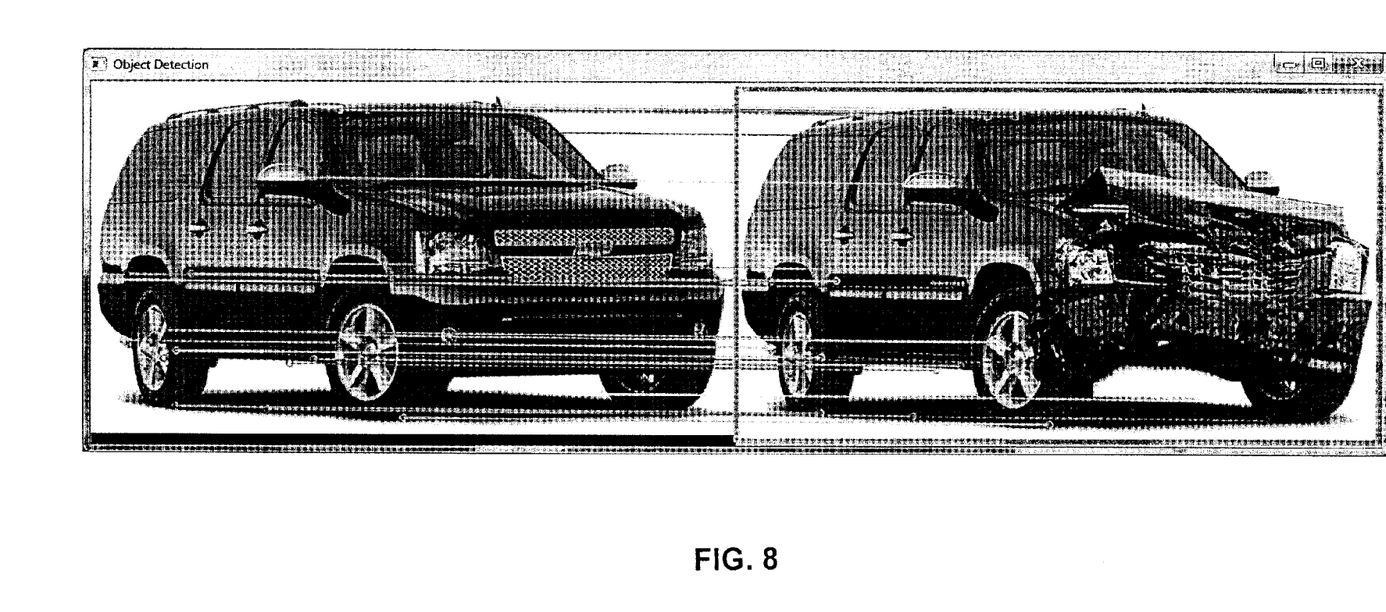
FIG. 8 is a screen shot of an exemplary one-to-one mapping of keypoints between the training image shown in FIG. 4 and the captured version of an object in the received image shown in FIG. 5.

In step 310, the image analysis computing device 14 determines if there are any matching descriptor vectors between the objects in the retrieved set of training images and the captured version of the object in the received image. FIG. 8 illustrates one example of a one-to-one mapping of keypoints between the vehicle illustrated in FIG. 4 and the damaged vehicle illustrated in FIG. 5. Referring again to FIG. 3, in this example, the determination of whether matching descriptors exist is performed using an approximate nearest neighbor search matcher algorithm to compare the received image of the captured version of the object and the object of the training images, although other methods of determining matching descriptors may be utilized. In this example, the approximate nearest neighbor search matcher algorithm is stored in the memory 22 of the image analysis computing device 14, although the approximate nearest neighbor search matcher algorithm may be stored in other locations on various devices, such as server 16.

If in step 310, the image analysis computing device 14 determines there are no matching descriptors, then the No branch is taken to step 302 where a new set of training images are retrieved. If in step 310, the image analysis computing device 14 determines that matching descriptors exist, then the Yes branch is taken to step 311 where the image analysis computing device 14 determines a value for the matching descriptors which quantifies the level of match between the descriptors. Next, in step 312, the image analysis computing device 14 determines whether the matching descriptors meet a threshold value for matching. The threshold value may be selectively input by a user through client device 12(1) or may be stored in the memory 22 of image analysis computing device 14, although the threshold values may be stored in other locations on other devices such as server 16.

If in step 312 the image analysis computing device 14 determines that the threshold is not satisfied, then the No branch is taken to step 302 where a new set of training images are retrieved as described earlier. If in step 312 the image analysis computing device 14 determines that the threshold is satisfied, then the object has been detected and the YES branch is taken to step 314.

Next, in step 314, the image analysis computing device 14 determines clusters in the captured version of the object in the received image that are related to each of the unmatched keypoints in the captured version of the object in the received image. The image analysis computing device 14 eliminates all matched keypoints from the captured version of the object in the received image and classifies only the unmatched keypoints between the object in the training images and the captured version of the object in the received image. The image analysis computing device 14 determines a cluster associated with each of the unmatched keypoints in the captured version of the object by comparing the descriptors of points surrounding the unmatched keypoint and determining an area of the captured version of the object with descriptors related to the one or more umatched keypoints. The descriptors indicate one or more visual features of the keypoints, such as shape, color, material, or other visual feature used to identify the particular keypoint. In this example, the classification is performed using a k-nearest neighbor (k-NN) algorithm to determine the area of related descriptors surrounding the unmatched keypoint, although other algorithms such as k-mean may be utilized.

Figure 5:
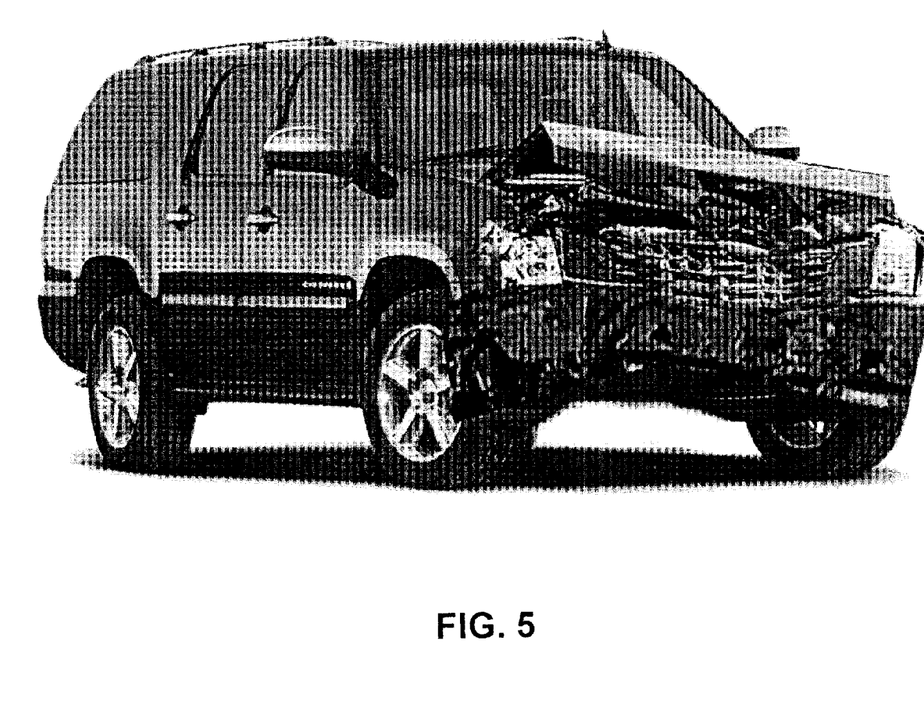
FIG. 5 is a screen shot of an exemplary captured version of an object in a received image.
Figure 9:
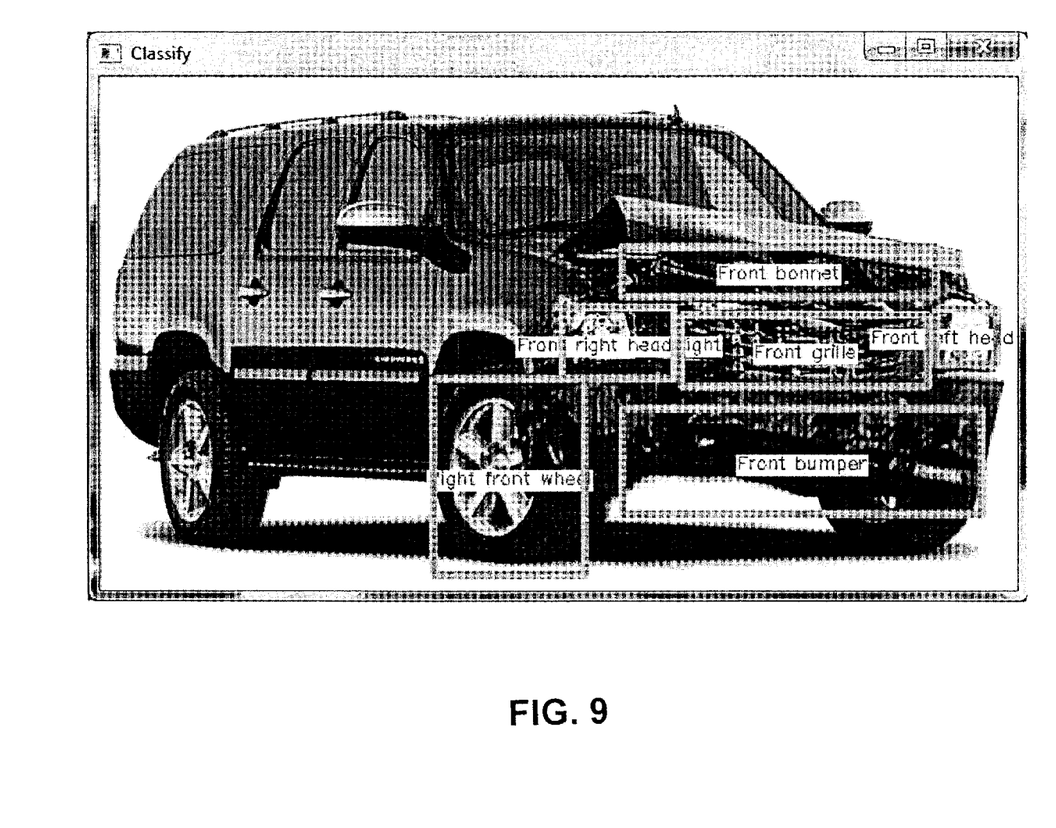
FIG. 9 is a screen shot of an exemplary output display after an image analysis.

In step 316, the image analysis computing device 14 identifies one or more parts in the captured version of the object in the received image, such as the front bonnet (hood), front grille, bumper, headlight, windshield, rear view mirror, or wheel in the vehicle of the vehicle illustrated in FIG. 5, based on the clusters determined in step 314. The image analysis computing device 14 further identifies sub-parts, such as the glass portion of the review mirror of the vehicle illustrated in FIG. 5. In this example, the image analysis computing device 14 determines k number of parts, based on the k-NN algorithm cluster determination, although the image analysis computing device may identify other numbers of parts using other methods. The image analysis computing device 14 classifies the parts/subparts as related to parts/subparts stored in the memory 22 for the training images in step 208 as set forth in FIG. 2. The classification of parts and subparts improves over time as the image analysis computing device 14 processes additional training images and had additional data upon which to base the classification. In one example, the image analysis computing device 14 presents the identification of part to the user through client devices 12(1) as illustrated in FIG. 9.

Referring again to FIG. 3, in step 318, the image analysis computing device 14 segments the parts/subparts identified in the captured version of the object in the received image into triangular sections, although other segmentations may be utilized. The triangular sections are drawn on the image based on threshold values of the grayscale image, although other values may be utilized to segment the image.

In step 320, the image analysis computing device 14 compares the parts of captured version of the object in the received image with the corresponding parts in the object of the training images stored in memory 22 as indicated in step 208 of the method set forth in FIG. 2. Next, in step 322, the image analysis computing device identifies changes in the parts based on the comparison between the parts of the captured version of the object in the received image and the parts of the training image stored in memory 22. The analysis identifies the change in surface status based on the comparison of the segmented images of the object, although the change status may be analyzed in other manners. The image analysis computing device 14 determines the change based on the position and density of the triangles in the captured version of the object and the existence of the unmatched keypoint between the captured version of the object and the object in the training images. For example, the change may be a dent or scratch. Further, the severity of the change is analyzed based on the weightage applied to the specific part containing the unmatched keypoint and stored in memory 22. The weightage for each keypoint may be assigned, for example, based on the type of material for the specific part/subpart.

In step 324, the image analysis computing device provides the changes to the user. The changes may be displayed on client device 12(1). The changes may be displayed with one or more items of data related to the parts which have changed including, for example, the material type, position on the vehicle, the type of change, and cost of replacement, although other information may be provided.

Accordingly, as illustrated and described with the examples herein this technology provides a more accurate image change analysis and assessment. As the image analysis is performed for both parts and subparts of a object level, fewer new training images are required to train the devices of the present invention. For example, for a vehicle, the image analysis would be performed for both the rearview mirror and the glass portion at the same time. Thus, there is no need for an additional training image of the rearview mirror alone. The keypoints based analysis between the received image and the training images requires less processing time. The image assessment is performed in a manner irrespective of image rotation, illumination, scale, viewpoint, or other image factors. Further, the present invention differentiates between different materials and identifies specific change types across the different materials. Accordingly, with this technology, image change analysis between images of an object can be improved and the time for processing can be decreased.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for assessing image change, the method comprising:

retrieving, by an image analysis computing device, based on a captured version of an object in a received image, one or more training images which display one or more related versions of the object and one or more items of data related to the one or more related versions of the object of the one or more training images;

determining, by the image analysis computing device, one or more keypoints which are invariant to changes in scale and rotation in the captured version of the object in the received image and in the related versions of the object in the one or more training images;

identifying, by the image analysis computing device, one or more changes to the object in the received image based on any of the determined one or more keypoints in the related version of the object which do not match the determined one or more keypoints in the captured version of the object;

determining, by the image analysis computing device, one or more contours in the related versions of the object in the one or more training images by thresholding the one or more training images;

applying, by the image analysis computing device, a weightage to the one or more determined contours;

identifying, by the image analysis computing device, one or more parts of the object in the related versions of the object based on the determined one or more contours;

storing, by the image analysis computing device, the one or more identified parts of the related versions of the object, the applied weightage, and one or more items of data related to the one or more identified parts; and providing, by the image analysis computing device, the identified one or more changes in the captured version of the object in the received image.

2. The method as set forth in claim 1 further comprising:
adjusting, by the image analysis computing device, the captured version of the object of the received image based on the related versions of the object of the one or more identified training images prior to the determining the one or more keypoints, wherein the adjusting comprises one or more of resizing and reorienting the captured version of the object of the received image based on the related version of the object of the one or more training images, adjusting image contrast, normalizing brightness, removing background, removing noise, or segmenting the received image.

3. The method as set forth in claim 1, wherein the one or more items of data related to the one or more identified parts comprises a material the one or more identified parts are made from.

4. The method as set forth in claim 1, wherein the identifying the one or more changes further comprises:
classifying, by the image analysis computing device, each of the determined one or more keypoints in the captured version of the object which do not match the determined one or more keypoints in the related versions of the object as one or more parts of the captured version of the object in the received image;
comparing, by the image analysis computing device, the classified one or more parts of the captured version of the object in the received image with the stored one or more parts in the related versions of the object in the one or more training images; and
identifying, by the image analysis computing device, the one or more changes based on the comparison of the classified one or more parts and the stored one or more parts.

5. The method as set forth in claim 4 wherein the classifying each of the determined one or more keypoints in the captured version of the object comprises:
determining, by the image analysis computing device, a cluster associated with each of the of the determined one or more keypoints in the captured version of the object in the received image which do not match the determined one or more keypoints in the related versions of the object in the one or more training images, wherein each cluster comprises a set of descriptors related to the determined one or more keypoints; and
identifying, by the image analysis computing device, the one or more parts of the captured version of the object in the received image associated with the determined unmatched keypoints based on the identified cluster.

6. The method as set forth in claim 4 further comprising:
determining, by the image analysis processing device, one or more segments on the classified one or more parts of the captured version of the object in the received image;
determining, by the image analysis processing device, a type of change in the identified one or more changes in the captured version of the object in the received image by comparing the one or more determined segments in the captured version and one or more segments in the stored one or more identified parts of the related versions of the object in the one or more training images along with one or more items of data related to the one or more identified parts to identify a type of change.

7. The method as set forth in claim 1 further comprising:
identifying, by the image analysis computing device, a descriptor for the one or more keypoints in the captured version of the object in the received image and in the related versions of the object in the one or more training images; and
determining, by the image analysis computing device, when one or more identified descriptors in the captured version of the object match one or more identified descriptors in the related versions of the object.

8. The method as set forth in claim 7 wherein the determining when one or more identified descriptors in the captured version of the object match one or more identified descriptors in the related versions of the object further comprises:
determining, by the image analysis computing device, a value for a match between the one or more identified descriptors in the captured version of the object match one or more identified descriptors in the related versions of the object;
determining, by the image analysis computing device, when the determined value for the match between the one or more identified descriptors in the captured version of the object match one or more identified descriptors in the related versions of the object satisfies a threshold value; and
determining, by the image analysis computing device, based on the determined value satisfying the threshold value, that the captured version of the object in the received image matches the related versions of the object in the one or more training images.

9. An image analysis computing device, comprising:
a processor coupled to a memory and configured to execute programmed instructions stored in the memory, comprising:
retrieving, based on a captured version of an object in a received image, one or more training images which display one or more related versions of the object and one or more items of data related to the one or more related versions of the object of the one or more training images;
determining one or more keypoints which are invariant to changes in scale and rotation in the captured version of the object in the received image and in the related versions of the object in the one or more training images;
identifying one or more changes to the object in the received image based on any of the determined one or more keypoints in the related version of the object which do not match the determined one or more keypoints in the captured version of the object;
determining one or more contours in the related versions of the object in the one or more training images by thresholding the one or more training images;
applying a weightage to the one or more determined contours;
identifying one or more parts of the object in the related versions of the object based on the determined one or more contours;
storing the one or more identified parts of the related versions of the object, the applied weightage, and one or more items of data related to the one or more identified parts; and
providing the identified one or more changes in the captured version of the object in the received image.

10. The device as set forth in claim 9 wherein the processor is further configured to execute programmed instructions stored in the memory further comprising:
adjusting the captured version of the object of the received image based on the related versions of the object of the one or more identified training images prior to the determining the one or more keypoints, wherein the adjusting comprises one or more of resizing and reorienting the captured version of the object of the received image based on the related version of the object of the one or more training images, adjusting image contrast, normalizing brightness, removing background, removing noise, or segmenting the received image.

11. The device as set forth in claim 9, wherein the one or more items of data related to the one or more identified parts comprises a material the one or more identified parts are made from.

12. The device as set forth in claim 9, wherein the identifying the one or more changes further comprises:
classifying each of the determined one or more keypoints in the captured version of the object which do not match the determined one or more keypoints in the related versions of the object as one or more parts of the captured version of the object in the received image;
comparing the classified one or more parts of the captured version of the object in the received image with the stored one or more parts in the related versions of the object in the one or more training images; and
identifying the one or more changes based on the comparison of the classified one or more parts and the stored one or more parts.

13. The device as set forth in claim 12 wherein the classifying each of the determined one or more keypoints in the captured version of the object comprises:
determining, by the image analysis computing device, a cluster associated with each of the of the determined one or more keypoints in the captured version of the object in the received image which do not match the determined one or more keypoints in the related versions of the object in the one or more training images, wherein each cluster comprises a set of descriptors related to the determined one or more keypoints; and
identifying, by the image analysis computing device, the one or more parts of the captured version of the object in the received image associated with the determined unmatched keypoints based on the identified cluster.

14. The device as set forth in claim 12 wherein the processor is further configured to execute programmed instructions stored in the memory further comprising:
determining one or more segments on the classified one or more parts of the captured version of the object in the received image;
determining a type of change in the identified one or more changes in the captured version of the object in the received image by comparing the one or more determined segments in the captured version and one or more segments in the stored one or more identified parts of the related versions of the object in the one or more training images along with one or more items of data related to the one or more identified parts to identify a type of change.

15. The device as set forth in claim 9 wherein the processor is further configured to execute programmed instructions stored in the memory further comprising:
identifying a descriptor for the one or more keypoints in the captured version of the object in the received image and in the related versions of the object in the one or more training images; and
determining when one or more identified descriptors in the captured version of the object match one or more identified descriptors in the related versions of the object.

16. The device as set forth in claim 15 wherein the determining when one or more identified descriptors in the captured version of the object match one or more identified descriptors in the related versions of the object further comprises:
determining a value for a match between the one or more identified descriptors in the captured version of the object match one or more identified descriptors in the related versions of the object;
determining when the determined value for the match between the one or more identified descriptors in the captured version of the object match one or more identified descriptors in the related versions of the object satisfies a threshold value; and
determining based on the determined value satisfying the threshold value, that the captured version of the object in the received image matches the related versions of the object in the one or more training images.

17. A non-transitory computer readable medium having stored thereon instructions for assessing image change comprising machine executable code which when executed by a processor, causes the processor to perform steps comprising:
retrieving, based on a captured version of an object in a received image, one or more training images which display one or more related versions of the object and one or more items of data related to the one or more related versions of the object of the one or more training images;
determining one or more keypoints which are invariant to changes in scale and rotation in the captured version of the object in the received image and in the related versions of the object in the one or more training images;
identifying one or more changes to the object in the received image based on any of the determined one or more keypoints in the related version of the object which do not match the determined one or more keypoints in the captured version of the object;
determining one or more contours in the related versions of the object in the one or more training images by thresholding the one or more training images;
applying a weightage to the one or more determined contours;
identifying one or more parts of the object in the related versions of the object based on the determined one or more contours;
storing the one or more identified parts of the related versions of the object, the applied weightage, and one or more items of data related to the one or more identified parts; and
providing the identified one or more changes in the captured version of the object in the received image.

18. The medium as set forth in claim 17 wherein the medium further comprises machine executable code which, when executed by the processor, causes the processor to perform steps further comprising:
adjusting the captured version of the object of the received image based on the related versions of the object of the one or more identified training images prior to the determining the one or more keypoints, wherein the adjusting comprises one or more of resizing and reorienting the captured version of the object of the received image based on the related version of the object of the one or more training images, adjusting image contrast, normalizing brightness, removing background, removing noise, or segmenting the received image.

19. The medium as set forth in claim 17, wherein the one or more items of data related to the one or more identified parts comprises a material the one or more identified parts are made from.

20. The medium as set forth in claim 17, wherein the identifying the one or more changes further comprises:
   classifying each of the determined one or more keypoints in the captured version of the object which do not match the determined one or more keypoints in the related versions of the object as one or more parts of the captured version of the object in the received image;
   comparing the classified one or more parts of the captured version of the object in the received image with the stored one or more parts in the related versions of the object in the one or more training images; and
   identifying the one or more changes based on the comparison of the classified one or more parts and the stored one or more parts.

21. The medium as set forth in claim 20 wherein the classifying each of the determined one or more keypoints in the captured version of the object comprises:
   determining, by the image analysis computing device, a cluster associated with each of the of the determined one or more keypoints in the captured version of the object in the received image which do not match the determined one or more keypoints in the related versions of the object in the one or more training images, wherein each cluster comprises a set of descriptors related to the determined one or more keypoints; and
   identifying, by the image analysis computing device, the one or more parts of the captured version of the object in the received image associated with the determined unmatched keypoints based on the identified cluster;
   adjusting the captured version of the object of the received image based on the related version of the object of the one or more identified training images prior to determining the one or more keypoints, wherein the adjusting comprises one or more of resizing and reorienting the captured version of the object of the received image based on the related version of the object of the one or more training images, adjusting image contrast, normalizing brightness, removing background, removing noise, or segmenting the received image.

22. The medium as set forth in claim 20 wherein the medium further comprises machine executable code which, when executed by the processor, causes the processor to perform steps further comprising:
   determining one or more segments on the classified one or more parts of the captured version of the object in the received image;
   determining a type of change in the identified one or more changes in the captured version of the object in the received image by comparing the one or more determined segments in the captured version and one or more segments in the stored one or more identified parts of the related versions of the object in the one or more training images along with one or more items of data related to the one or more identified parts to identify a type of change.

23. The medium as set forth in claim 17 wherein the medium further comprises machine executable code which, when executed by the processor, causes the processor to perform steps further comprising:
   identifying a descriptor for the one or more keypoints in the captured version of the object in the received image and in the related versions of the object in the one or more training images; and
   determining when one or more identified descriptors in the captured version of the object match one or more identified descriptors in the related versions of the object.

24. The medium as set forth in claim 23 wherein the determining when one or more identified descriptors in the captured version of the object match one or more identified descriptors in the related versions of the object further comprises:
   determining a value for a match between the one or more identified descriptors in the captured version of the object match one or more identified descriptors in the related versions of the object;
   determining when the determined value for the match between the one or more identified descriptors in the captured version of the object match one or more identified descriptors in the related versions of the object satisfies a threshold value; and
   determining based on the determined value satisfying the threshold value, that the captured version of the object in the received image matches the related versions of the object in the one or more training images.

* * * * *